United States Patent [19]
Izzard

[11] Patent Number: 4,619,411
[45] Date of Patent: Oct. 28, 1986

[54] RECOVERY APPARATUS

[76] Inventor: Derek S. Izzard, 12 Potton Road, Gamlingay, Cambridgeshire, England

[21] Appl. No.: 628,263

[22] Filed: Jul. 6, 1984

[30] Foreign Application Priority Data

Jul. 12, 1983 [GB] United Kingdom ............... 8318848
Nov. 2, 1983 [GB] United Kingdom ............... 8329281

[51] Int. Cl.⁴ .......................................... B02C 19/12
[52] U.S. Cl. .................................. 241/101.4; 81/9.51; 140/105; 241/236
[58] Field of Search ........................... 29/825; 81/9.51; 72/185, 186, 187, 196; 140/105; 83/345; 241/236, 261, 101.4

[56] References Cited

U.S. PATENT DOCUMENTS

| | | | |
|---|---|---|---|
| 2,591,943 | 4/1952 | Kitselman | 140/105 X |
| 2,683,500 | 7/1954 | Goodloe | 140/105 X |
| 2,851,103 | 9/1958 | Anthony et al. | 83/345 |
| 2,914,643 | 11/1959 | Fields et al. | 140/105 X |
| 3,309,947 | 3/1967 | Denney | 81/9.51 |
| 3,577,813 | 5/1971 | Vorontsov | 81/9.51 |
| 4,020,548 | 5/1977 | Pohl | 81/9.51 |

FOREIGN PATENT DOCUMENTS

| | | | |
|---|---|---|---|
| 104387 | 8/1966 | Denmark | 83/345 |
| 1918467 | 2/1978 | Fed. Rep. of Germany | 81/9.51 |
| 2351475 | 12/1977 | France | 81/9.51 |

Primary Examiner—Howard N. Goldberg
Assistant Examiner—Carl J. Arbes
Attorney, Agent, or Firm—Young & Thompson

[57] ABSTRACT

An apparatus for and a method of extraction reinforcements from reinforced cable is described. The apparatus comprises gears between which the reinforcement is engaged and pulled from the remaining cable, the gears also serving to impart a deformation to the reinforcement. A subsequent engagement between gears imparts further deformation sufficient to cause fracture of the reinforcement.

A tool attachment for the apparatus comprises an elongate member having a passage for the reinforcement and a tapered end portion which causes the outer strands of a centrally reinforced cable to spread as they are pulled over the end portion. The tool is preferably used in combination with a cutter which cuts the strands after they have been pulled over the end portion. A blade may also be attached to the tool to cooperate with the cutter.

5 Claims, 8 Drawing Figures

RECOVERY APPARATUS

This invention relates to removal of cores from metal cored cables and in particular to removal of steel cores from aluminium cable.

Many cables, and in particular aluminium cable used for electrical transmission lines, are provided with a reinforcement, often as a core, of a high tensile strength material, usually high tensile steel. When these cables have served their purpose it is desirable to be able to separate the reinforcement material from the rest of the cable, usually the strands, which, especially in the case of aluminium, has a high scrap value.

Currently some machines for removing steel cores from aluminium cable exist, these generally employing the principle of threading one end of the core through a hole in a plate, and pulling so that the core is pulled through while the aluminium is held back by the plate. The core is usually pulled by being wound on to a drum. As high tensile steel is very springy as well as hard, handling the extracted core is very difficult, and cutting it is excessively wearing on cutting tools. Thus it is usual for the core to be wound on to a collapsible reel with the turns of the cable on the reel bound together, the wound and bound cable then being removed from the reel and placed in a furnace for softening.

The present invention is directed towards providing a machine which extracts and fragments core material and thus alleviates handling difficulties.

Accordingly the invention provides an apparatus for fragmenting wire comprising at least one pair of gears the teeth of which are set to loosely engage so that a metal wire fed between the teeth is engaged and pulled along and is so deformed that fracture occurs.

Preferably the wire is engaged by two sets of gears, the first set deforming but not fracturing the wire and the second set causing further deformation and ultimate fracture of the wire.

The invention also provides a method of removing a metallic core from a cable comprising engaging one end of the core between toothed wheels so that the core is pulled from the cable and deformed, then passing the so deformed core to a second engagement between toothed wheels to increase the deformation to the point of fracture.

It is advantageous to use a tool for separating a reinforcing core material from surrounding strands, the tool comprising an elongate member with longitudinal walls defining a passage for receiving the core and having a tapered end portion which causes the strands to separate as they are pulled on to the tool.

The invention is now described by way of example with reference to the accompanying drawings in which.

Figure 1:
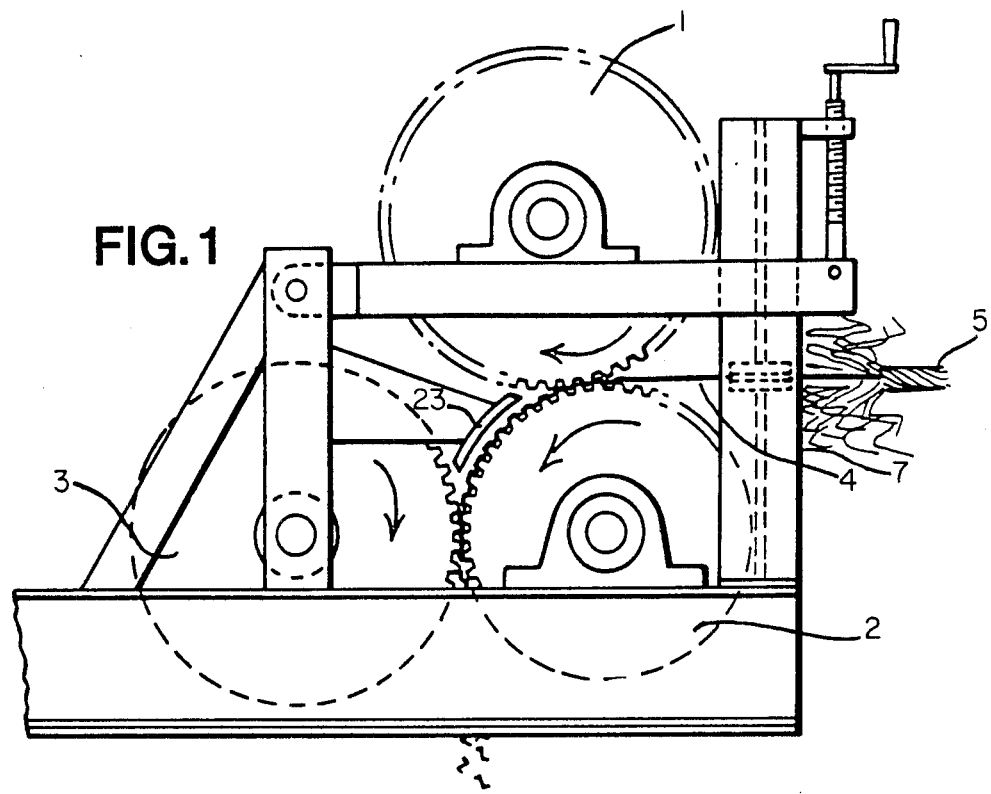
FIG. 1 is a side view of a core extracting apparatus according to the invention.
Figure 2:
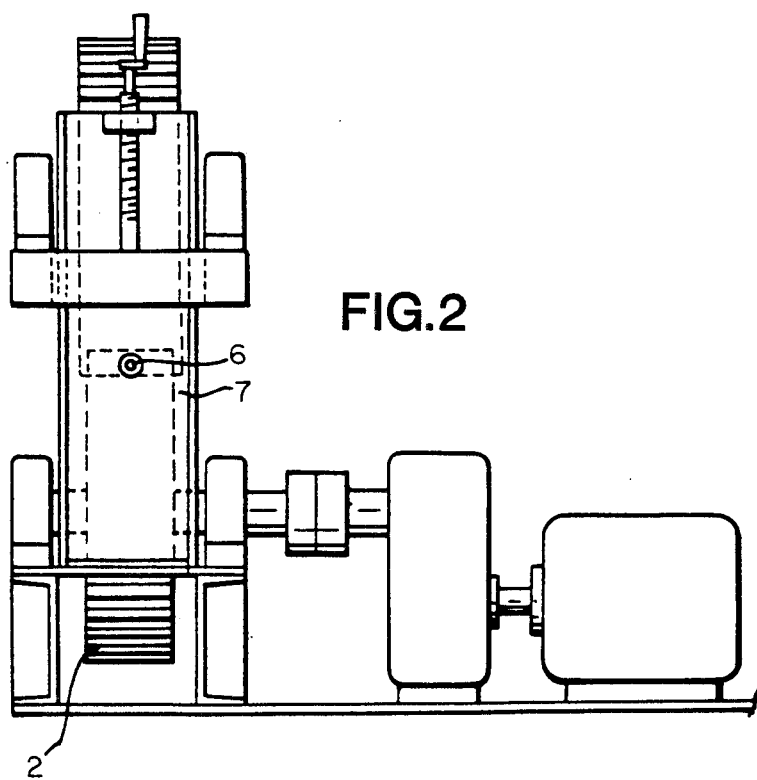
FIG. 2 is a front view of a wire extracting apparatus according to the invention.
Figure 3:
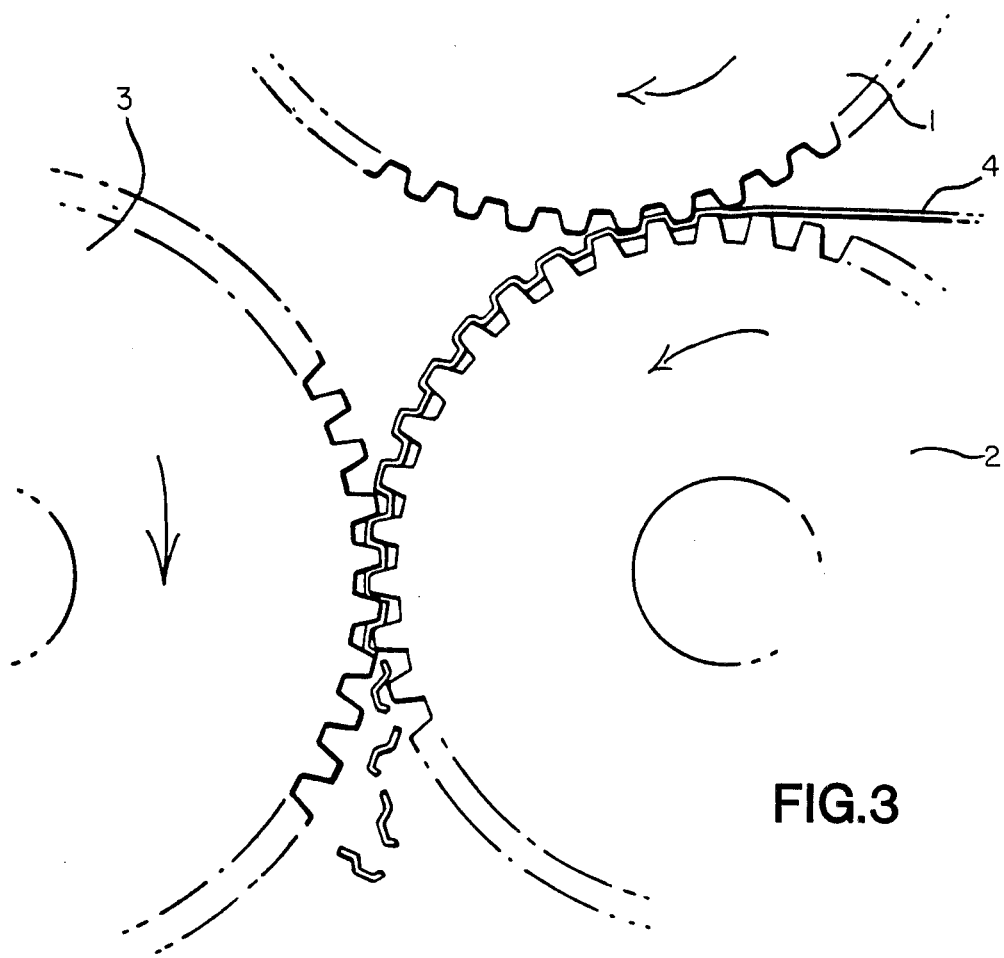
FIG. 3 is a side view of a cutting gear mechanism of the invention.

Referring to FIGS. 1 to 3, there are gear-wheels indicated by numerals 1, 2 and 3. These gears are made of hard material such as hardened steel. A steel core 4 from an aluminium stranded cable 5 is passed through an aperture 6 in a plate 7 and is engaged by the teeth of gear-wheels 1 and 2 which, as they rotate in the directions indicated by the arrows, pull the core from the aluminium cable and also cause the core to be deformed. The deformed cable is then carried by gear-wheel 2 to a second engagement between gear-wheels 2 and 3 which are set closer together than the gear-wheels 1 and 2. The closer setting of gear-wheels 2 and 3 causes the core to be pressed deeper into the recesses between the teeth and, as the core is held, relatively, by gear-wheels 1 and 2, it becomes further stretched and eventually fractures, usually at high stress areas at the corners of the teeth. A guide 23 is provided to deflect the core 4 towards the second set of gears in the event that it springs away, through premature fracture or for other reasons, from the gear 2.

It is possible to omit gear 3 and for the gears 1 and 2 to be set to cause fracture, but this is inconvenient with the illustrated arrangement as it means the core becomes disengaged from the apparatus and some further means for keeping the core 4 engaged must be incorporated. By passing the initially deformed core to a second stage where the deformation is increased the core stays engaged in the apparatus and a continuous pull is possible.

In order to prevent accidental fracture at the first stage of deformation, at least the leading edges of the gears 1 and 2 are preferably rounded. It should be noted that if, as shown in FIG. 1, the strands of the cable 5 are permitted to build-up against the plate 7 a considerable back pressure resisting removal of the core occurs and the core must be clamped within the apparatus. In the illustrated embodiment the first set of gears 1 and 2, provide this clamping function as well as the first stage of deformation.

In an alternative embodiment of the invention there are four gear-wheels, the second stage of deformation taking place between gear 3 and the fourth gear. In this instance one gear of each pair must be driven whereas in the first embodiment only gear-wheel 2 (the common gear) was driven. The four gear embodiment enables a lesser loading on the shafts as the drive is shared; however the adjustment to the preferred position of the gears for the second stage of deformation in which the teeth register with the deformations imparted by the teeth of the first stage of deformation may be more difficult than in the first embodiment.

The fragments of the core after the second stage of deformation are of a convenient size (i.e. a few centimeters in length) for collection and placement in a furnace without necessity for binding and other inconveniences associated with the unfragmented lengths of core.

Figure 4:
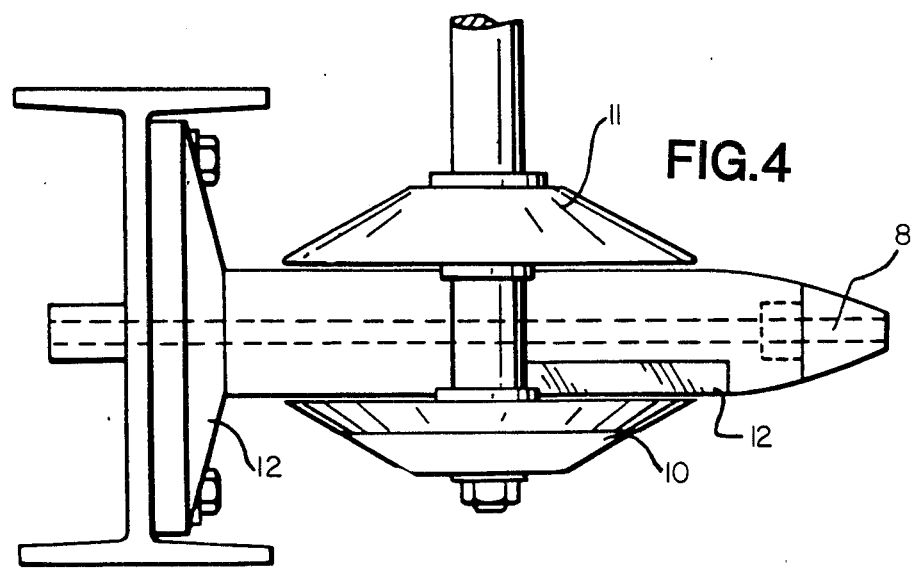
FIG. 4 is a view from above of a tool attachment for an apparatus according to the invention.

Although an apertured plate has proved satisfactory for holding back aluminium strands from which a steel core is withdrawn, as mentioned above the progressive build-up of aluminium against the plate increases the force required to extract the core. In order to alleviate the problems associated with build-up the apparatus may be fitted with a tool such as that shown in FIG. 4. The tool shown is generally elongate and has a central bore 8 through which the core material is threaded prior to its engagement between the first pair of gears. The tool may be generally conical in shape or as shown in FIG. 4 have a conical or tapered nose portion, the remaining part of the tool being shaped to co-operate with other parts of the apparatus. A cutter 10 and a guide 11 are positioned alongside the tool each at a similar distance from the nose portion. At the end of the tool remote from the nose portion, a flange 12 is provided with which to attach (for example by way of screws) the tool to the cutting apparatus. The tool may be attached to the cutting apparatus either in place of the apertured plate, or it may be positioned (or attached) in front of the plate with the bore aligned with the aperture.

In operation, a length of the core 4 of a cable is bared, threaded through the tool and engaged between the gears of the cutting apparatus. Then, as the core is pulled through the tool by the rotation of the gears, the outer strands of the cable ride up over the nose portion, becoming spread as they do so, and are eventually pulled into contact with the cutter 10. As the strands are originally twisted in a helical manner around the core, they impinge obliquely on the cutter and are cut at each point where the helical path crosses the line of the cutter, thus the strands are cut into lengths corresponding approximately to the length of one helical path around the core. The guide 11, which is shown positioned opposite the cutter in FIG. 4, is static and causes any severed strands impingeing on it to be pushed downwards towards a collecting bin. The sides of the tool may be shaped or recessed as shown at 12 to aid separation of the cut strands from the tool and to minimise accumulation of strand fragments in the vicinity of the cutter.

Figure 5:
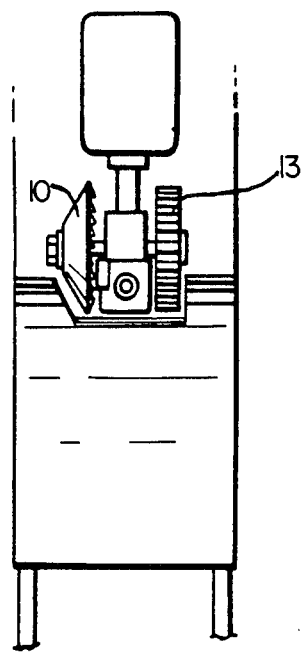
FIG. 5 is a front view of a further embodiment of the invention incorporating a cutter and pushing wheel.

Instead of, or in addition to, the static guide 11 for the fragments of the strands, a wheel may be mounted to rotate so as to push the fragments towards a collecting bin. Such an arrangement is shown in FIG. 5 where a wheel 13 replaces the static guide 11 and is driven on the same axle as the cutter 10.

The apparatus as described above has been made using a cutter from a milling machine, such cutters usually having tungsten carbide tips. The type of cable which is to be salvaged by this apparatus is usually greased and therefore application of a lubricant is not necessary. In the event that a lubricant or coolant is desired this may be applied in the vicinity of the cutter or directed along the tool to penetrate beneath the strands of cable as they ride over the nose portion.

The nose portion of the tool is subject to a substantial amount of friction and becomes hot, eventually deforming especially around the end of the bore. In order to facilitate replacement the nose piece may be removable, for example by unscrewing, and simply substituted by a new or rebored nose portion. A coolant may be directed on to the outside of the cable in the vicinity of the nose piece.

In one embodiment, the tool is hollow rather than solid with a longitudinal bore, however the latter type of tool is generally preferred as it is stronger and facilitates the mounting of the attachments directly on to the tool. For example, the cutter may be mounted on the tool or a composite cutter may be used with a fixed blade on the tool and a rotating blade that presses the strands against the fixed blade, the fixed blade taking the pressure of the cut.

Figure 6:
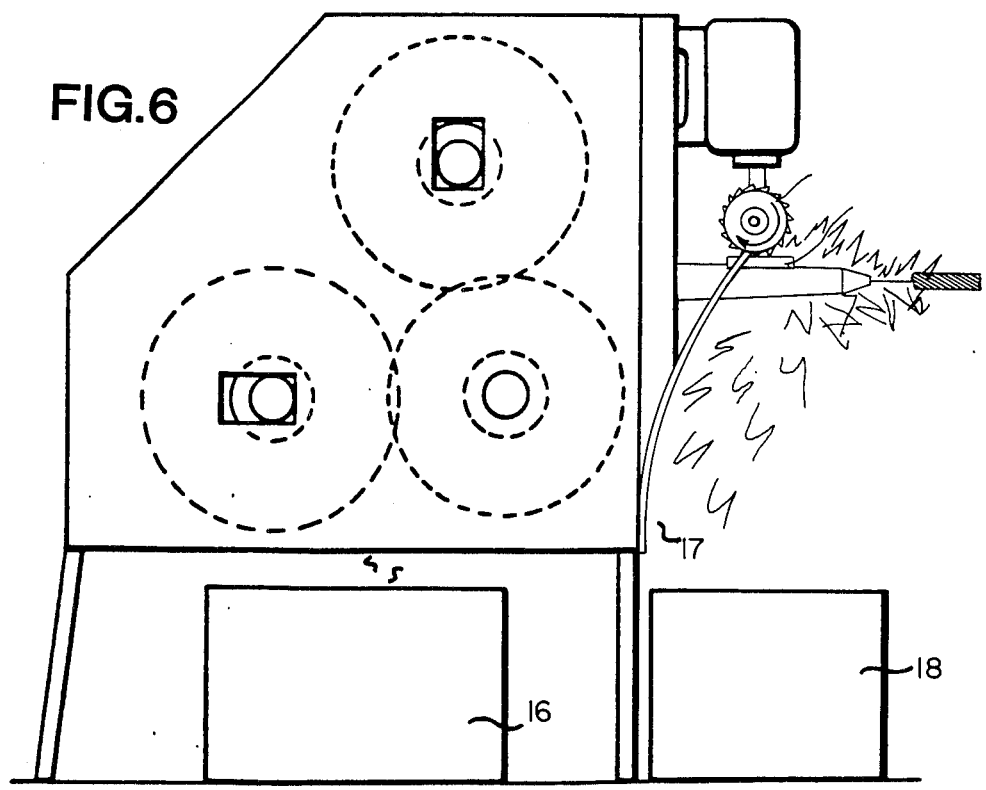
FIG. 6 is a side view of a preferred embodiment of the invention incorporating a cutter and tool attachment.

In a particularly preferred embodiment shown in FIG. 6 a fixed blade 14 is attached to the tool and a cutting wheel 15 is mounted above the tool to cut the stands as they impinge between the fixed blade 14 and cutting wheel 15. As shown in this Figure the fragments of core fall into a collecting bin 16 and the cut strands fall, guided by chute 17, into a collecting bin 18.

Figure 7:
FIG. 7 is a sectional view of a cable with a non-central reinforcement.
Figure 8:
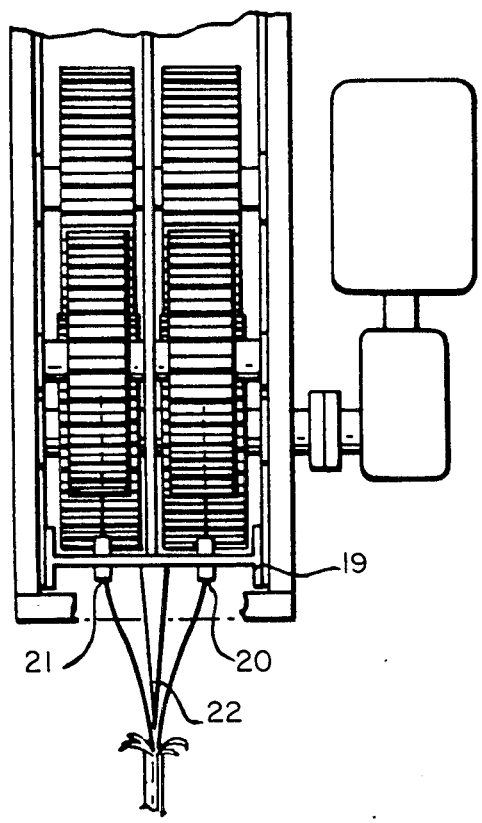
FIG. 8 is an overhead view of an apparatus according to the invention modified to process the cable of FIG. 7.

Some types of cable are covered in a plastics sheath. In this instance a blade may be incorporated into the apparatus to cut the sheath. One particular type of cable for which a further modification of the invention may be employed, comprises a reinforcement material that is bound alongside the cable it is to support by a plastics sheath, the sheath may surround the combined periphery or hold the cables apart in a FIG. 8 configuration as illustrated in FIG. 7. To cope with this type of material the apparatus of the present invention is modified as shown in FIG. 8 by the addition of a plate 19 with two apertures 20,21 and a blade 22 mounted on the plate between the apertures. In operation, the reinforcement material is threaded through one aperture and the strands of cable (which are usually aluminium or copper) are threaded through the other, the cable strands and reinforcement each then pass through a set of deforming gears as previously described for reinforcement cores, only in this instance two sets of gears are mounted side by side, one set for pulling and deforming the cable strands and the other for the cable reinforcement. The blade mounted between the apertures cuts the sheath to separate the core and cable as the pulling action of the gears pulls them along causing the plastics sheath to impinge on the cutter.

The force required to extract the core from the cable depends on many factors such as the gauge of the cable and core, whether or not a cutter is used and also upon how tightly the core is engaged by the strands. An experimental prototype of an apparatus according to the invention utilised gears of approximately 35 cm in diameter (such as are used for the large final drive gears of a bulldozer) with the teeth being about 1.5 cm deep and each tooth having a tip width of about 0.5 cms, the base of the recesses between the teeth also having a width of 0.5 cm. The thickness of the gears was 7.5 cm.

This prototype had 7.5 cm bearing shafts and was driven by a 6 cylinder diesel engine of an 8 ton truck coupled through two gear boxes set in their lowest gears. Of course this prototype had an excessive power capability and a smaller, electric motor could be used. The prototype was capable of processing cables of the dimensions shown in table 1.

TABLE 1

| Cable Designation Nominal mm2 | No of Aluminium Strands | Diameter of each Al Strand | No of Steel Strands | Diameter of each steel Strand |
| --- | --- | --- | --- | --- |
| 25 mm2 | 6 | 2.36 mm | 1 | 2.36 mm |
| 30 mm2 | 6 | 2.59 mm | 1 | 2.59 mm |
| 40 mm2 | 6 | 3.00 mm | 1 | 3.00 mm |
| 50 mm2 | 6 | 3.35 mm | 1 | 3.35 mm |
| 70 mm2 | 12 | 2.79 mm | 7 | 2.79 mm |
| 100 mm2 | 6 | 4.72 mm | 7 | 1.57 mm |
| 150 mm2 | 30 | 2.59 mm | 7 | 2.59 mm |
| 150 mm2 | 18 | 3.35 mm | 1 | 3.35 mm |
| 175 mm2 | 30 | 2.79 mm | 7 | 2.79 mm |
| 175 mm2 | 18 | 3.61 mm | 1 | 3.61 mm |
| 200 mm2 | 18 | 3.86 mm | 1 | 3.86 mm |
| 200 mm2 | 30 | 3.00 mm | 7 | 3.00 mm |
| 400 mm2 | 54 | 3.18 mm | 7 | 3.18 mm |

The 'nominal mm2' refers to the nominal total cross section of the aluminium strands: it is not an accurate figure but rounded to the nearest '5'. In addition to the above there are sometimes other cables constructed for special purposes e.g. 6:1 strands of 4.72 mm diameter, and it is envisaged that this may be processed as described herein.

The above table is given in British Standards as these are the cables actually experimented with. In U.S. standards it is envisaged that the apparatus could process most or all cables e.g. from 6 AWG which has 6 Aluminium and 1 steel strand of 1.68 mm diameter, upto 6363 mcm which has 18 Aluminium and 1 steel strand, each of 4.78 mm diameter.

I claim:

1. Apparatus for fragmenting high tensile steel cores of electrical cables, the apparatus comprising first and second sets of meshing gears supported on respective axles, a framework supporting the axles of said first and second sets of gears and having means for setting the first set of gears to clamp the core, at least one of said first set of gears having driving means for rotating the first set of gears to progressively deform the core and convey the deformations into register with the second set of gears and at least one of the second set of gears having driving means for rotating the second set of meshing gears to stretch and fracture the core.

2. The apparatus defined in claim 1 in which the first and second sets of gears have similarly sized teeth.

3. The apparatus defined in claim 1 comprising a common gear that meshes with a first gear, the common gear and the first gear comprising the first set of gears, the common gear also meshing with a second gear to comprise the second set of gears, and in which the common gear meshes more loosely with the first gear than with the second gear.

4. Apparatus for fragmenting high tensile steel cores of electrical cables, the apparatus comprising a framework supporting a drive gear that meshes with each of two driven gears, the drive gear and driven gears having teeth of similar size, means for engaging the core between the drive gear and a first one of the driven gears so that rotation of the drive gear imparts successive deformations to the core, the deformed core being conveyed by the drive gear into engagement between the drive gear and the second driven gear with the deformations in register with the meshing teeth of the drive gear and second driven gear, the drive gear and second driven gear being set to mesh more closely than the first driven gear and drive gear to impart greater deformation to fracture the core into pieces commensurate with the size of the teeth of the gears.

5. The apparatus of claim 4 further comprising a tool mounted for receiving the cable prior to engagement between the first driven wheel and the drive wheel, the tool being adapted to strip plastics sheath coatings and outer cable strands from the high tensile steel core.

* * * * *